Jan. 3, 1928.
G. MEYER
1,654,661
TROLLEY FOR ELECTRIC DRIVING CARS
Filed Dec. 11, 1926
4 Sheets-Sheet 1
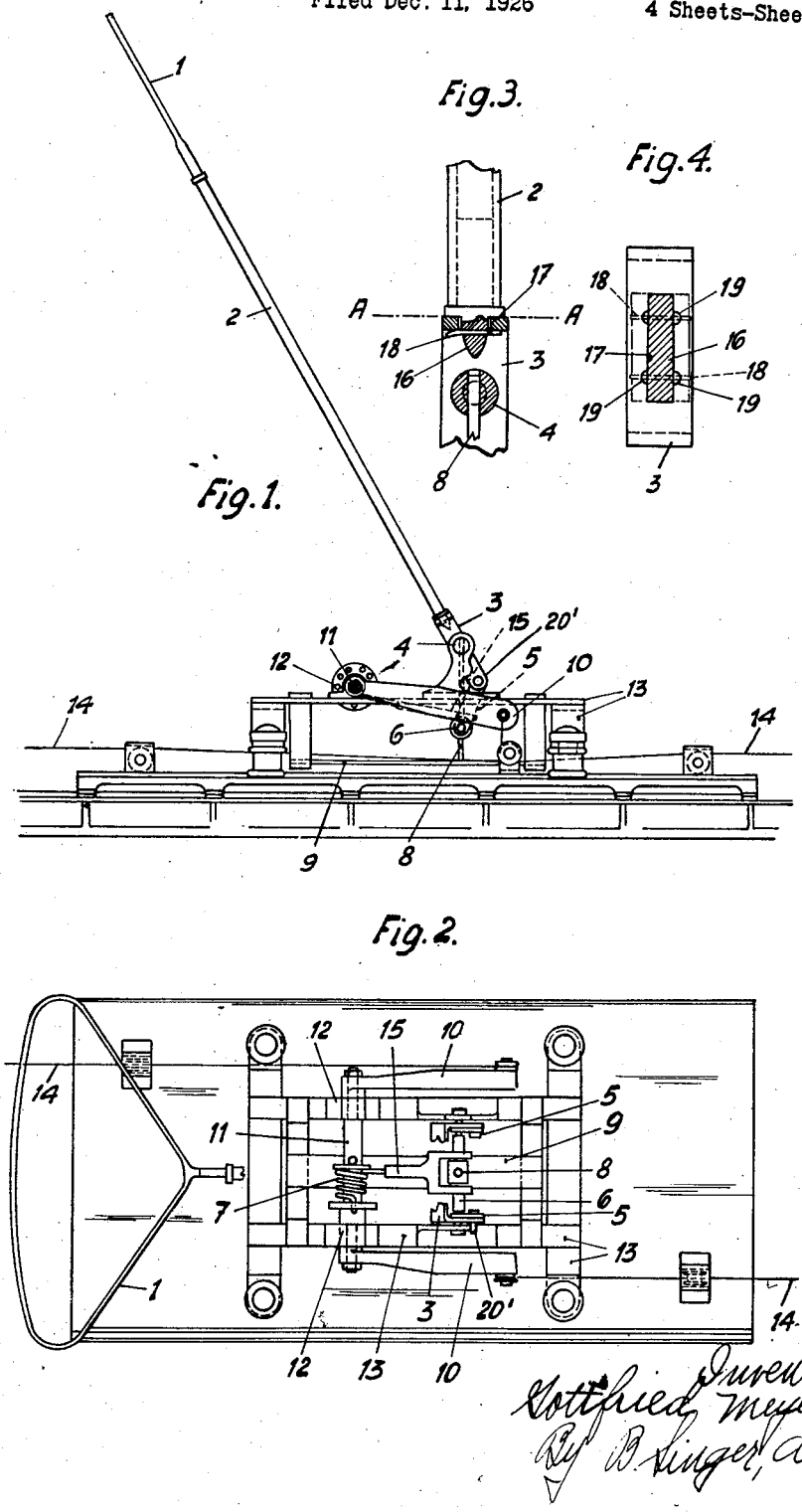

Jan. 3, 1928.  1,654,661
G. MEYER
TROLLEY FOR ELECTRIC DRIVING CARS
Filed Dec. 11, 1926  4 Sheets-Sheet 2

Inventor
Gottfried Meyer

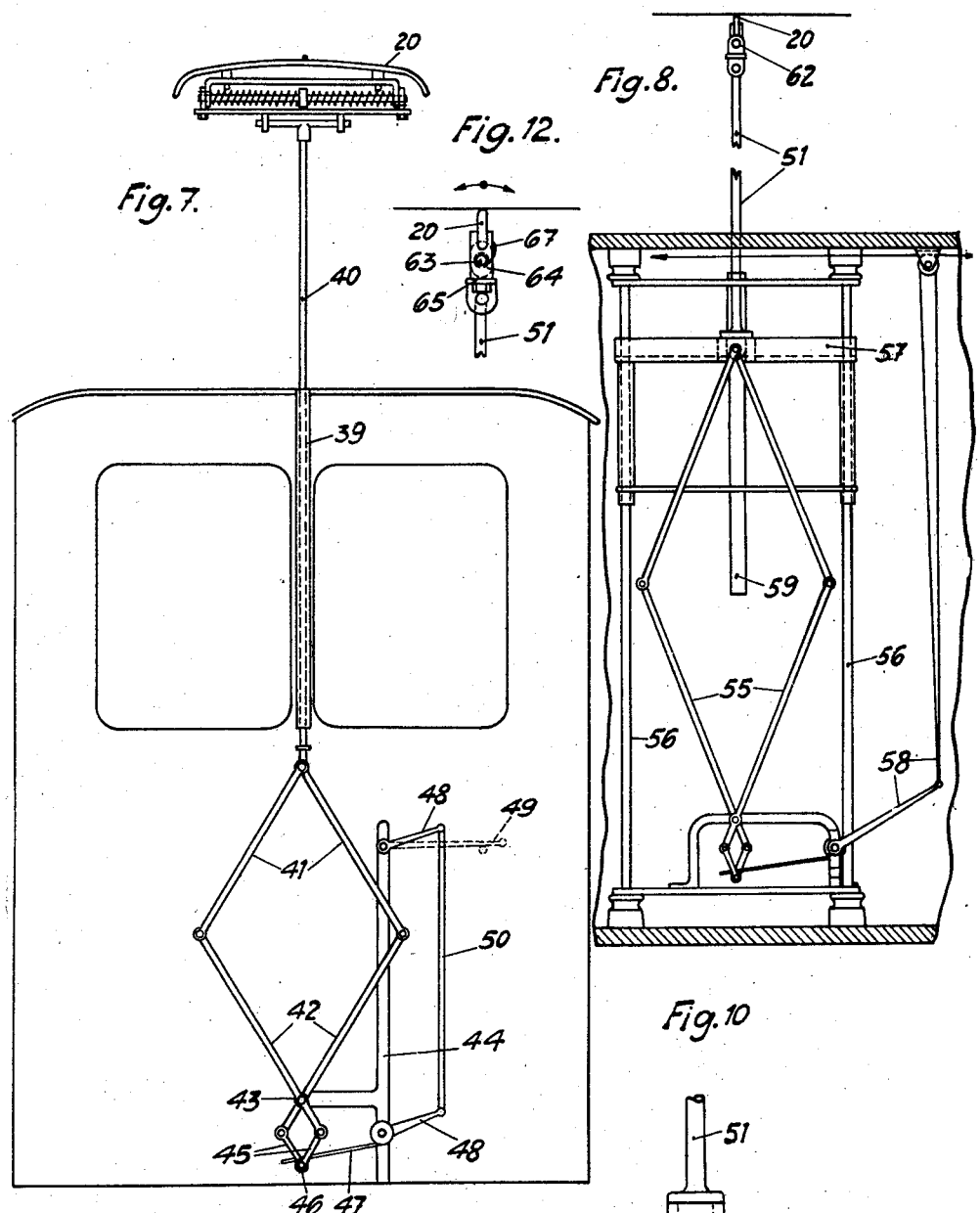

Jan. 3, 1928.
G. MEYER
1,654,661
TROLLEY FOR ELECTRIC DRIVING CARS
Filed Dec. 11, 1926   4 Sheets-Sheet 4
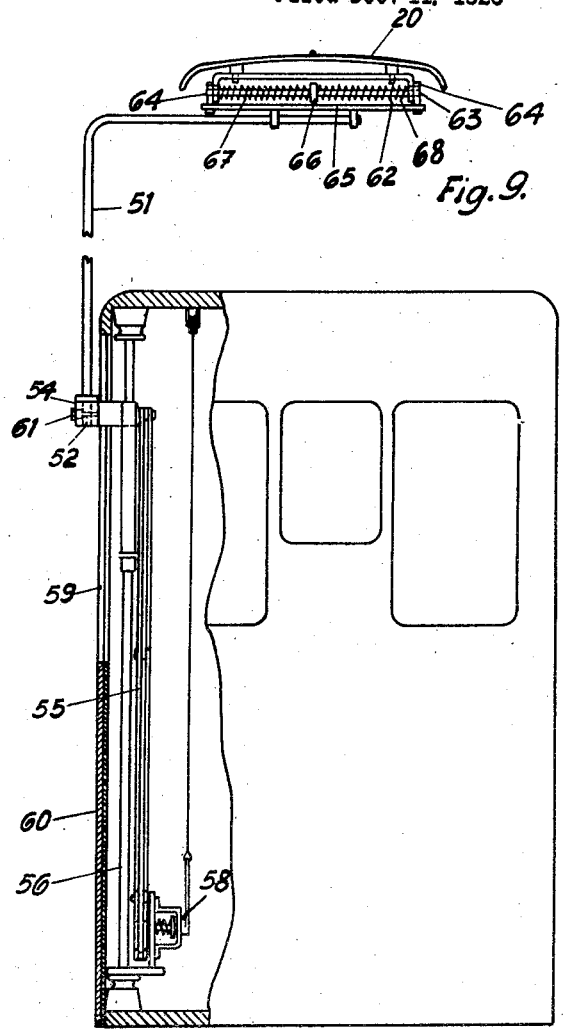
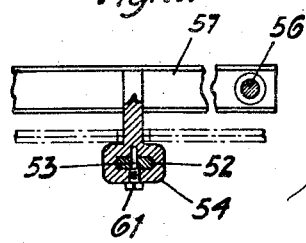

Patented Jan. 3, 1928.

1,654,661

UNITED STATES PATENT OFFICE.

GOTTFRIED MEYER, OF ZURICH, SWITZERLAND, ASSIGNOR TO MATHILDE McGILLI-CUDDY, OF MINNEAPOLIS, MINNESOTA.

TROLLEY FOR ELECTRIC DRIVING CARS.

Application filed December 11, 1926, Serial No. 154,135, and in Switzerland February 2, 1926.

The invention relates to a trolley for electrically propelled driving vehicles, for example railway locomotives and tramway driving cars. According to the invention the member sliding on the current conducting wire is pressed against the wire by a torsion spring, which spring is adapted to be compressed and expanded by hand by means of pulling members actuated from the driver's position.

In the accompanying drawings are illustrated three examples of construction.

Fig. 1 shows this as a folding loop trolley in side elevation in the normal position.

Fig. 2 is a plan view thereof.

Figs. 3 and 4 are details thereof, Fig. 4 being a section on the line A—B of Fig. 3, Figs. 5 and 6 show a tong-shaped trolley in side and end elevation.

Fig. 7 is an elevation of a modified form of the invention.

Fig. 8 is a similar view, partly in section of another modified form of the invention.

Fig. 9 is a vertical section of the form of the invention shown in Fig. 8 and on a plane at right angles to that of said Fig. 8.

Fig. 10 is a detail elevation of the lower end portions of the trolley rod according to the form of the invention shown in Figs. 8 and 9 and coacting parts.

Fig. 11 is a detail sectional view of the same and its connections.

Fig. 12 is a detail elevation of the upper portion of said trolley rod, the cross bar and the sliding member and their connections.

Figure 5:
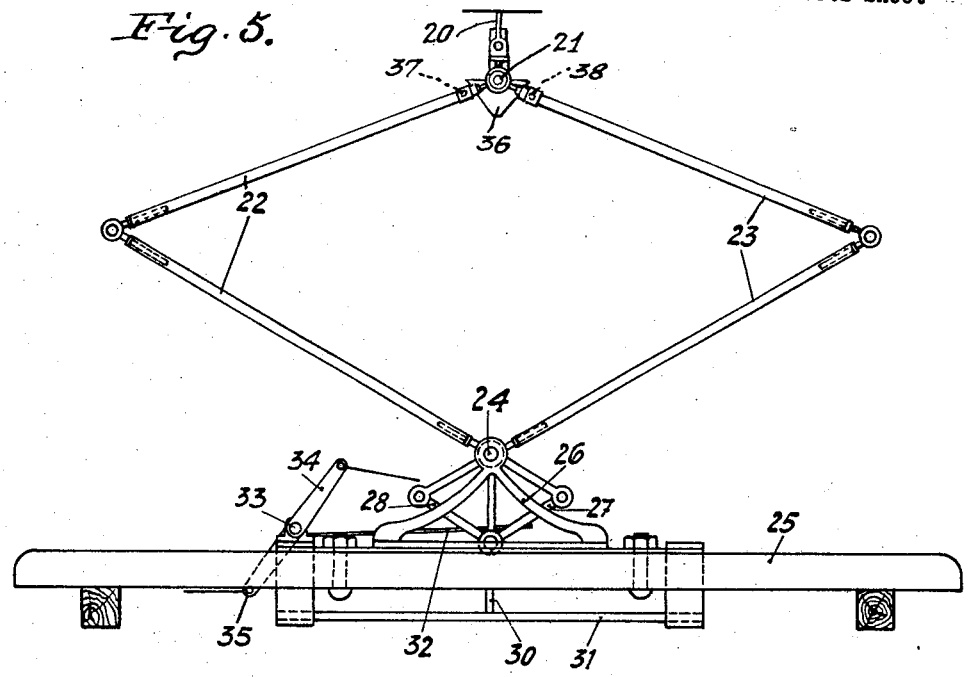

The trolley according to Figs. 1 to 4 is provided with a loop 1, which is resiliently adjustable in a pole 2. The latter is connected to a U-shaped strap 3 pivotally mounted on a shaft 4. The shaft 4 is rotatably mounted in a frame secured to the roof of the driving car. To the strap 3 are connected the ends of links 5 of which the other ends are hingedly connected to a cross bar 6 guided by a guide bar 8. The cross bar 6 is slidably mounted on the vertical guide bar 8 which latter is rigidly connected to a support 9 rigidly secured to the car. On a rigid arm 16 of this cross bar 6 acts one end of the torsion spring 7, mounted on a shaft 11 and to which the other end of the torsion spring 7 is secured. The shaft 11 is mounted in bearings 12 of the rigid framework 13. To the two ends of the shaft 11 are secured levers 10 which are connected to pulling member 14 leading to the driver's position of the car in order to enable the current receiving loop 1 to be pressed against the trolley wire. When pulling the pulling members 14 the shaft 11 is rotated and thus the spring 7 is pressed against the arm 16 which presses the cross bar 6 downwardly, while, by means of the links 5, the strap 3 is turned and the trolley loop 1 is pressed upwardly against the trolley wire. The spring 7 is thus more or less tensioned according to the strength of the pull.

When the pulling member is released the action of the spring 7 on the loop 1 ceases, the latter falling by reason of gravity. The spring 7 is untensioned. The levers 10 are formed as weighted levers by means of which a certain balancing of forces is obtained. The pole 2 is provided with a wedge-shaped extension 16 extending through a longitudinal slot 17 of the strap 3 in such a manner that a certain amount of free movement is provided for. In the extension 16 transversely thereto and underneath the strap 3 there are provided pins 18 having a predetermined cross section. Directly over the ends thereof, which project from both sides of the extension 16 and engage under the strap, notches 19 are provided in the slot 17 (Figs. 3 and 4).

When the trolley loop 1 receives a shock or impact in the longitudinal direction of the car, which exceeds a predetermined permissible amount, the pins 18 are bent downwardly and slide through the notches. The pole 2 thus loses its hold and falls (breaking the circuit) downwardly on to the roof of the car or laterally on to the track of the car.

In a fully equipped driving car with a device for each direction of travelling the strap 3 is also provided with a pin extending some distance which serves as a stop in order to prevent the loop 1 from exceeding a certain position in height or from folding towards the other side.

Figure 6:
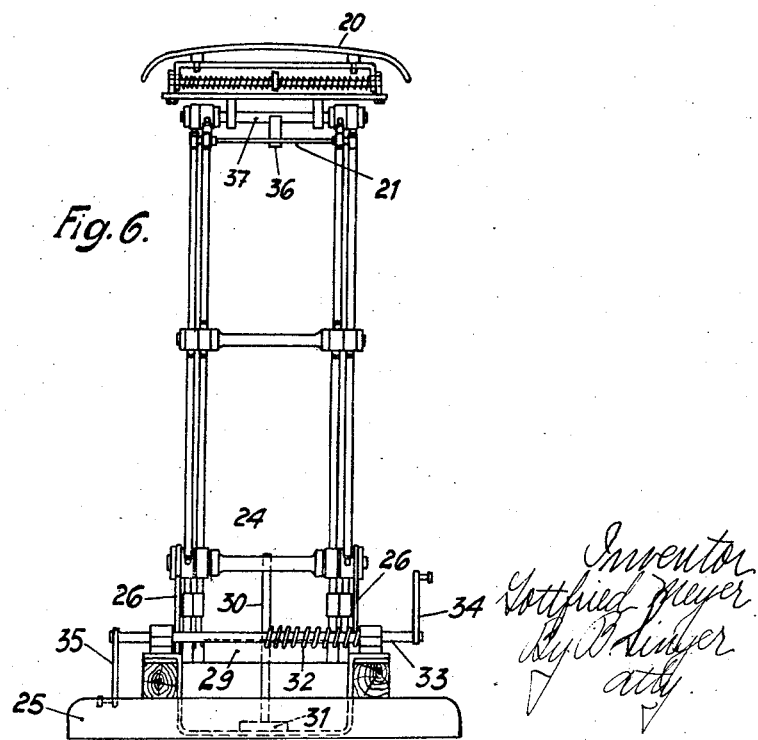

According to the second form of construction according to Figs. 5 and 6 a sliding member 20 is connected to a cross bar 21. This cross bar 21 is mounted in the upper ends of a pair of rods 22, 23 rotatably supported on a shaft 24. The latter is rigidly mounted in bearings 26 of a bridge 25. To the pairs of rods 22, 23 are attached additional short rods 27, 28 connected to a cross bar 29, which latter is traversed by a guide rod 30. This guide rod 30 is at one end secured to a carrier 31 and at the other end to the shaft 24. The guide arm 29 is slidably mounted on the end 30 while, a torsion spring 32 tends to press the guide arm 29 downwardly or to press the sliding member 20 against the trolley wire, which spring 32 is again mounted on a shaft 33 rotatably mounted in bearings of the bridge 25. To both ends of this shaft 33 are secured levers 34, 35 provided with pulling members leading to the driver's position for the purpose of tensioning or slackening the spring 32. The cross bar 21 is provided with a wedge-shaped extension 36 (Fig. 6). This bears against rods 37, 38 provided in the pairs of the rods 22, 23 thus rendering a tipping over of the cross bar 21 or of the sliding member 20 impossible. The trolley loop is described in further detail at the end of this specification.

The third form of construction according to Fig. 7 consists of a rod 40 axially slidable in a guide tube 39 which at the upper end carries the sliding member 20 in the form of a strap. With the lower end of the rod 40 engage links 41 connected to further links 42, which latter are supported in a support 44 by means of a shaft 43. Links 45 hinged to the links 42 are at their other ends connected together by pivots 46 on which pivots 46 there acts a spring 47, as in the first example of construction, which may be tensioned and slackened by means of levers 48, 49 and a rod 50. These types of trolleys are arranged at the ends inside or outside the car.

An essential difference in the construction of the trolley according to Figs. 8 and 9 resides therein that the pantograph or the two pantographs are mounted on one of the longitudinal sides of the car. The rod 51 bent at right angles and carrying the trolley 62 is provided at its lower free end with a bearing lug 52 provided with a hole 53. This bearing lug 52 rests in a fitting 54, which latter is rigidly connected to the movable links 55 or to a cross bar 57 guided by guide rods 56. The guide rods 56 with the links and the actuating device are secured and insulated in the interior of the car, to one of the longitudinal walls thereof, while the fitting 54 passes through a slot 59 in the side wall 60 and projects outwardly. The rod 51 or its bearing lug 52 is secured by a pin 51, which must be of predetermined cross section and which is screwed into the fitting 54. The rod 51 carries the trolley 62 which is resiliently held in position by spring action over the roof of the car in the middle thereof.

If an impact or shock acts on the trolley in the longitudinal direction of the car and exceeds a predetermined permissible amount, then by reason of the pressure the pin 61 is sheared off. The rod 51 thus loses its hold and falls downwardly as already described in connection with the first example of construction. Small permissible shocks are absorbed by the spring strap 62. The actual sliding member 21 is for this purpose pivotally mounted on a shaft 63 which latter is supported in bearings 64 of a cross bar 65. This cross bar 65 is rigidly coupled to the rod 51. On both sides of a collar 66 of the shaft 63 are arranged springs 67, 68 which act on the sliding trolley 20 in such a manner that this is held resiliently in the middle position according to Fig. 12.

In all forms of construction a short comparatively weak pull on the pulling members suffices to tension the tension spring and to press the trolley against the trolley wire; when the pulling member is released the spring is slackened and the trolley falls downwardly so that the circuit is broken rapidly.

What I wish to secure by U. S. Letters Patent is:—

1. A trolley for electric driving cars comprising a current receiving part, a torsion spring, adapted to press the said part against the overhead wire, means to tension and to slacken said spring, said means comprising a pulling member leading to the driver's position, means to connect the trolley pole to the actuating means said connecting means comprising pins adapted to be sheared off if the pull exceeds a predetermined amount.

2. A trolley for electric driving cars comprising a current receiving part, a torsion spring, adapted to press the said part against the trolley wire, means to tension and to slacken said spring, said means comprising a pulling member leading to the driver's position, the rod carrying the trolley being axially movable in a guide, spring actuated links engaging said rod.

3. A trolley for electric driving cars comprising a current receiving part, a torsion spring adapted to press the said part against the overhead wire, a horizontally disposed shaft supporting said torsion spring, an arm fixed to said shaft, a pulling member fixed to said shaft, a vertically guided crossbar, operatively connected to the trolley sliding member the whole being mounted on one of the longitudinal sides of the car the lifting device being provided on the inside and the rod carrying the trolley on the outside of the longitudinal side wall, the fitting extending through a slot in the side wall for receiving the rod.

In witness whereof I affix my signature.

GOTTFRIED MEYER.